United States Patent
Kim et al.

(10) Patent No.: US 10,040,338 B2
(45) Date of Patent: Aug. 7, 2018

(54) APPARATUS FOR CONTROLLING TINT OF DISPLAY PANEL PROVIDED ON VEHICLE WINDOW TO ADJUST LIGHT TRANSMITTANCE

(71) Applicant: MYONGJI UNIVERSITY INDUSTRY AND ACADEMIA COOPERATION FOUNDATION, Yongin-si, Gyeonggi-do (KR)

(72) Inventors: Min Jae Kim, Seoul (KR); Bong Suk Choi, Uijeongbu-si (KR); Seung Jae Oh, Chuncheon-si (KR); Tae Yong Cho, Ansan-si (KR); Hyeon Min Choi, Icheon-si (KR); So Yeon Park, Incheon (KR); Byeong Jin Eom, Ulsan (KR); Kyung Min Lee, Seongnam-si (KR)

(73) Assignee: Myongji University Industry and Academia Cooperation Foundation, Yongin-si, Gyeonggi-do (KR)

( * ) Notice: Subject to any disclaimer, the term of this patent is extended or adjusted under 35 U.S.C. 154(b) by 0 days.

(21) Appl. No.: 15/424,910

(22) Filed: Feb. 6, 2017

(65) Prior Publication Data
US 2018/0015811 A1    Jan. 18, 2018

(30) Foreign Application Priority Data

Jul. 12, 2016    (KR) .................. 10-2016-0088091

(51) Int. Cl.
*B60J 3/04*    (2006.01)
*G02F 1/01*    (2006.01)
(Continued)

(52) U.S. Cl.
CPC .............. *B60J 3/04* (2013.01); *G02F 1/0121* (2013.01); *G05B 19/048* (2013.01);
(Continued)

(58) Field of Classification Search
CPC ........ B60J 3/04; G02F 1/0102; G02F 1/0121; G02F 1/15; G02F 1/157; G02F 1/163;
(Continued)

(56) References Cited

U.S. PATENT DOCUMENTS 6,373,618 B1 *    4/2002    Agrawal .............. G02F 1/1521
                                                                  359/254
6,498,598 B2 *    12/2002    Watanabe ......... H04L 12/40058
                                                                  345/156

(Continued)

FOREIGN PATENT DOCUMENTS

JP    08-207569 A    8/1996
KR    20-1998-0025751 U    8/1998
(Continued)

OTHER PUBLICATIONS

International Search Report of PCT/KR2016/014941 dated Apr. 14, 2017.

*Primary Examiner* — Loha Ben
(74) *Attorney, Agent, or Firm* — Rabin & Berdo, P.C.

(57) ABSTRACT

Disclosed is an apparatus for controlling tint of a display panel provided on a vehicle window to adjust light transmittance depending on ambient light conditions, thereby overcoming difficulties in securing a clear view, such as glare caused by sunlight or high-beam headlamps of a vehicle in the opposite direction lane during driving. The apparatus includes: a display panel film attached to a window glass of the vehicle, and having an adjustable tint; an operation unit setting the tint of the display panel film; a detection sensor unit quantifying a change in an external environment into data; and a control unit adjusting the tint of the display panel film according to a preset program by using the data received from the detection sensor unit.

7 Claims, 4 Drawing Sheets

(51) Int. Cl.
*G05B 19/048* (2006.01)
*G09G 5/00* (2006.01)

(52) U.S. Cl.
CPC .............. *G05B 2219/23104* (2013.01); *G05B 2219/2628* (2013.01); *G09G 5/00* (2013.01)

(58) Field of Classification Search
CPC . G02F 1/19; G02B 26/00; G05B 2219/23104; G05B 2219/2628; G05B 19/048; G02C 7/101; G02C 7/102; G02C 7/104; G09G 5/00; G09G 5/003; G09G 5/005
USPC ........ 359/238, 244, 245, 265, 275; 345/156, 345/625
See application file for complete search history.

(56) References Cited

U.S. PATENT DOCUMENTS

| | | | |
|---|---|---|---|
| 6,795,226 B2 * | 9/2004 | Agrawal | B32B 17/10036 359/254 |
| 7,050,042 B2 * | 5/2006 | Watanabe | H04L 12/40058 345/156 |
| 7,110,157 B2 * | 9/2006 | Beteille | B32B 17/10036 359/265 |
| 8,102,586 B2 * | 1/2012 | Albahri | B60J 3/04 359/265 |

FOREIGN PATENT DOCUMENTS

| | | |
|---|---|---|
| KR | 10-2011-0057616 A | 6/2011 |
| KR | 10-2012-0071249 A | 7/2012 |
| KR | 10-2013-0062518 A | 6/2013 |
| KR | 10-1510949 B1 | 4/2015 |

\* cited by examiner

APPARATUS FOR CONTROLLING TINT OF DISPLAY PANEL PROVIDED ON VEHICLE WINDOW TO ADJUST LIGHT TRANSMITTANCE

CROSS REFERENCE TO RELATED APPLICATION

The present application claims priority to Korean Patent Application No. 10-2016-0088091, filed Jul. 12, 2016, the entire contents of which is incorporated herein for all purposes by this reference.

BACKGROUND OF THE INVENTION

Field of the Invention

The present invention relates generally to an apparatus for controlling tint of a display panel provided on a vehicle window to adjust light transmittance depending on ambient light conditions, thereby overcoming difficulties in securing a clear view, such as glare caused by sunlight or high-beam headlamps of a vehicle in the opposite direction lane during driving.

Description of the Related Art

During driving, there are many difficulties in securing a clear view due to high-beam headlamps of a vehicle in the opposite direction lane or direct sunlight at sunset.

When a driver cannot stably secure the view and thus an accident occurs, not only the driver but also adjacent vehicle occupants may be seriously harmed. Therefore, it is very important to secure the view of a driver. Accordingly, there are various methods of stably securing the view of a driver in unfavorable conditions such as driving at night, or in direct sunlight.

Various methods of tinting a vehicle window are used to secure the view of a driver. For example, one of the most commonly used methods of tinting a vehicle window is a method of attaching a translucent film on a vehicle window to tint the window, whereby light transmittance is uniformly reduced.

Generally, when purchasing a vehicle, a manufacturer provides coupons for tinting vehicle windows. In addition, the tinting is performed at a different company. When attaching a tinted film that has high light transmittance, the light blocking effect is low, and thus it is meaningless to attach such a tinted film. When attaching a tinted film that has low light transmittance, it is difficult for a driver to see ahead because the tinted film is too dark, particularly at night.

In the meantime, once a tinted film is attached on a vehicle window, it is impossible to change light transmittance, and it is difficult to remove the tinted film, and thus additional expense is required for removal thereof.

For another example, another commonly used method of tinting a vehicle window is a method of attaching a sun-guard to a sun visor of a vehicle by using a fixing member such as a fixing clip. Generally, the sun-guard has a shape of a translucent polarizing acrylic plate, and is flexible and portable such that the sun-guard is used for blocking sunlight and direct light as occasion demands.

With the above-described methods for blocking sunlight, it is difficult to immediately manage the blocking of light depending on the intensity of light. In addition, the sun-guard is unstably fixed, which may disturb driver concentration.

In order to solve such problems, a number of vehicle products for blocking sunlight have been proposed.

As one of the vehicle products, multiple staged tinted windows are disclosed in Korean Patent Application Publication No. 10-2012-0071249 (publication date: 2 Jul. 2012). The multiple staged tinted windows are provided next to a window glass and can be raised and lowered in the same manner as the window glass.

The foregoing is intended merely to aid in the understanding of the background of the present invention, and is not intended to mean that the present invention falls within the purview of the related art that is already known to those skilled in the art.

DOCUMENT OF RELATED ART (Patent Document 1) Korean Patent Application Publication No. 10-2012-0071249 (publication date: 2 Jul. 2012).

SUMMARY OF THE INVENTION

Accordingly, the present invention has been made keeping in mind the above problems occurring in the related art, and the present invention is intended to provide an apparatus effectively blocking light that disturbs driving.

In addition, the present invention is intended to provide the apparatus adjusting light transmittance of a vehicle window depending on the intensity of ambient light.

In addition, the present invention is intended to provide the apparatus manually or automatically adjusting tint of a display panel film provided on the vehicle window.

In addition, the present invention is intended to provide the apparatus being operated without a separate power supply because the apparatus is operated by a battery of the vehicle.

In order to achieve the above object, according to one aspect of the present invention, there is provided an apparatus for controlling tint of a display panel provided on a vehicle window to adjust light transmittance depending on ambient light conditions, the apparatus including: a display panel film attached to a window glass, and having an adjustable tint; an operation unit for setting the tint of the display panel film; a detection sensor unit for quantifying a change in an external environment into data; and a control unit adjusting the tint of the display panel film according to a preset program, based on the data received from the detection sensor unit.

Preferably, according to the present invention, the detection sensor unit may include a light detection sensor attached to the window glass, the light detection sensor for outputting a signal indicative of an amount of detected light to the control unit so as to adjust the tint of the display panel film.

Preferably, according to the present invention, the detection sensor unit may include a speed detection sensor provided on a wheel and a driving shaft of the vehicle, the speed detection sensor for outputting a signal indicative of a speed change to the control unit so as to adjust the tint of the display panel film depending on a moving speed of the vehicle.

Preferably, according to the present invention, the detection sensor unit may include a temperature detection sensor for outputting a signal indicative of a temperature change to the control unit so as to adjust the tint of the display panel film.

Preferably, according to the present invention, the control unit may include a variable resistor having a resistance value varied in response to a signal output from the detection sensor unit, wherein the varied resistance value varies a power value, and the tint of the display panel film is adjusted depending on the varied power value.

According to the apparatus for controlling the tint of the display panel provided on the vehicle window to adjust light transmittance, it is possible to manually or automatically adjust light transmittance depending on intensity of ambient light.

In addition, the apparatus for controlling the tint of the display panel provided on the vehicle window to adjust light transmittance can be easily constructed, and can be easily detachable.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Hereinbelow, embodiments of the present invention will be described in detail with reference to the accompanying drawings.

Figure 1:
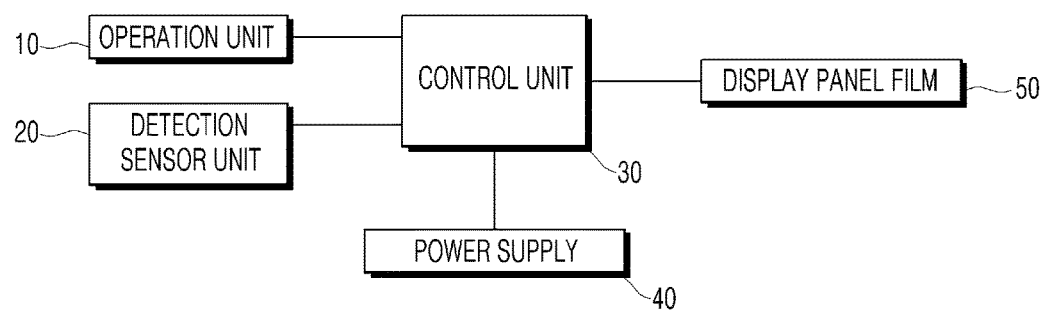
FIG. 1 is a block diagram showing an apparatus for controlling tint of a display panel provided on a vehicle window to adjust light transmittance according to the present invention.

FIG. 1 is a block diagram showing an apparatus for controlling tint of a display panel provided on a vehicle window to adjust light transmittance.

A display panel film 50 is attached to a windshield of a vehicle, and has an adjustable tint, namely, light and shade can be adjusted. A control unit 30 receives a signal from an operation unit 10 connected with the display panel film 50 or from a detection sensor unit 20, compares the received signal with a programmed set value, and adjusts tint of the display panel film 50.

When a driver feels discomfort in securing a clear view due to headlights or high-beam headlights of a vehicle in the opposite direction lane during driving, the driver may tint the display panel film 50 by using the operation unit 10. In addition, when the view is dark due to the display panel film 50 during driving at night, the driver may make the display panel film 50 transparent or may turn off the function of the display panel film, whereby the view may be adjusted to be in a transparent condition.

In the meantime, tint of the display panel film 50 may be automatically adjusted by using the control unit 30 connected with the detection sensor unit 20. In order to smoothly operate the control unit 30, a battery 42 of a vehicle may be used as a power supply 40 supplying the power to the control unit.

A program of the control unit 30 is required to have a processor being operated with the detection sensor unit 20, and having a processing speed sufficient to perform functions of the control unit 30 in real-time.

In addition, the control unit is a system requesting an immediate response. The control units, for example, may use C language for programming to properly operate the immediate response. In order to be used as a vehicle component, the control unit may include a separate module that is stable and makes a processing speed fast.

The detection sensor unit 20 may include a light detection sensor 22 detecting brightness levels of sunlight or of headlights of another vehicle, a speed detection sensor 24 detecting a driving speed of a vehicle, and a temperature detection sensor 26 detecting an external temperature of a vehicle.

In addition, various types of detection sensors may be used for safely driving a vehicle.

Figure 2:
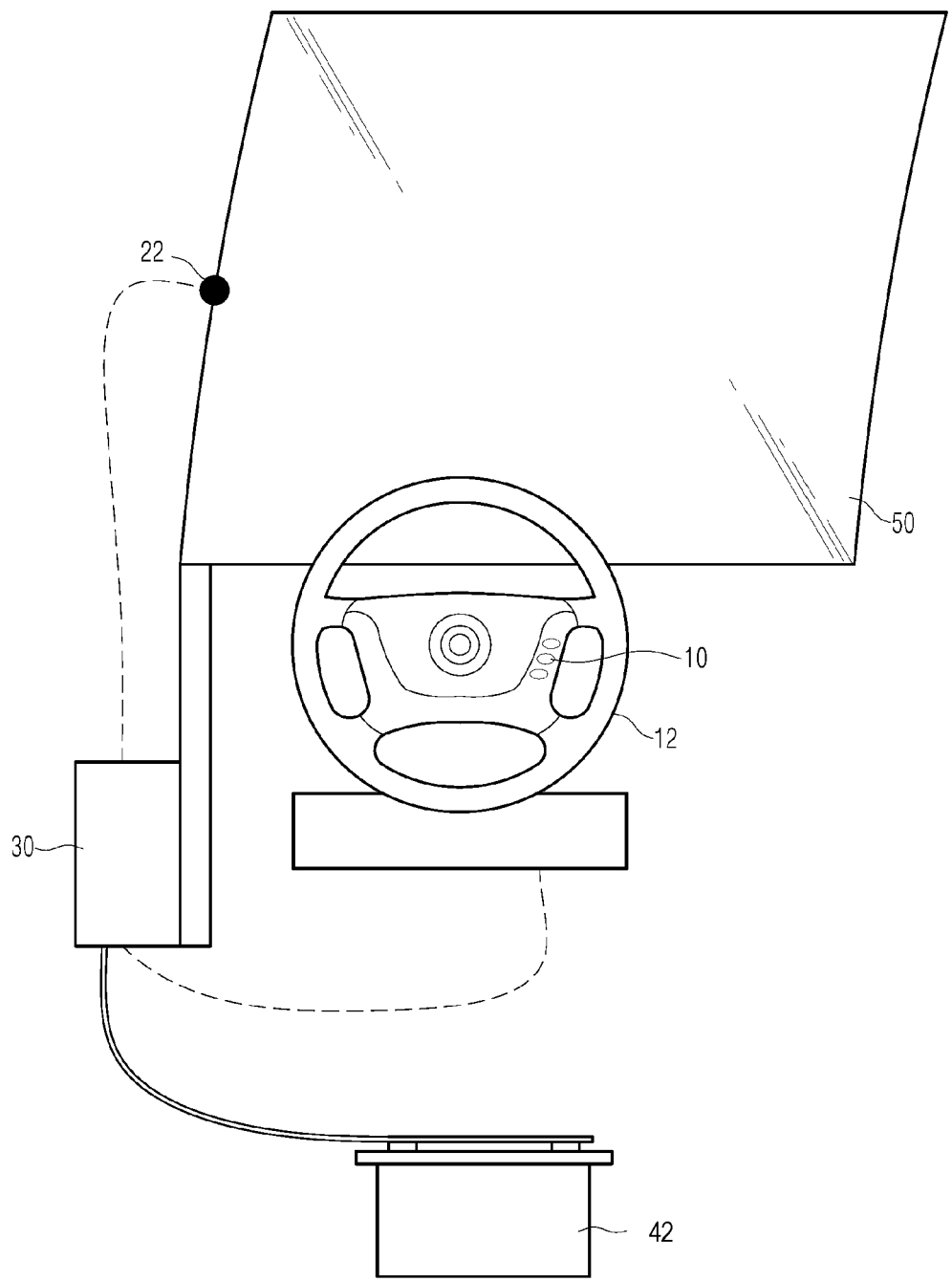
FIG. 2 is a view showing a first embodiment of an apparatus for controlling tint of a display panel provided on a vehicle window to adjust light transmittance according to the present invention.

FIG. 2 is a view showing an embodiment of a display panel film provided on a vehicle window, the display panel film adjusting light transmittance.

The display panel film 50 is attached to the windshield of a vehicle. The display panel film 50 is curved, or flexible to be easily attached, and is better to have adhesion.

One side of the display panel film 50 is connected to the operation unit 10, and a driver may adjust tint of the display panel film to a desired tint, thereby adjusting the tint of the display panel film. In addition, when an automatic adjustment function of the operation unit 10 is used, signals from various sensors of the detection sensor unit 20 are compared with data values set in the control unit 30, and the tint of the display panel film 50 is automatically adjusted.

That is, for user convenience, the tint of the display panel film 50 may be adjusted by using the operation unit 10 for selecting automatic or manual functions.

When using a manual function, power of the control unit 30 is blocked by using an on/off switch of the operation unit 10, and thus, the display panel film 50 may not be used. Alternatively, only automatic resistance determination functions of the detection sensor unit 20 and of the control unit 30 are turned off, whereby tint of the display panel film 50 may be manually adjusted by using a switch of the operation unit 10.

The operation unit 10 may be provided on a steering 12 of a driver's seat, and may be provided at any position where a driver can easily operate the operation unit.

When using an automatic function, the detection sensor unit 20 connected to the control unit 30 may include the light detection sensor 22, the speed detection sensor 24, the temperature detection sensor 26, etc. In addition, the detection sensor unit may further include another detection sensor detecting another condition of an external environment to secure a clear view for a driver depending on changes of the external environment.

The light detection sensor 22 may be attached on a portion of a windshield without disturbing the view of a driver. The light detection sensor quantifies brightness levels of sunlight or of headlights of a vehicle approaching in the opposite direction lane into data, and outputs the data to the control unit 30.

Here, the control unit 30 receives the data from the light detection sensor 22, and compares the data with preset data, whereby a variable resistance value of a constant-current system provided in the control unit 30 is changed, and a voltage is adjusted according to Ohm's law (V=IR). A power value (P=VI) changes due to the changed voltage. When an amount of light is high, the tint of the display panel film 50 is adjusted to enhance a blocking ratio of the display panel film.

In the meantime, the tint of the display panel film 50 with regard to an amount of light detected by the light detection sensor 22 may be changed anytime for a user's convenience.

Figure 3:
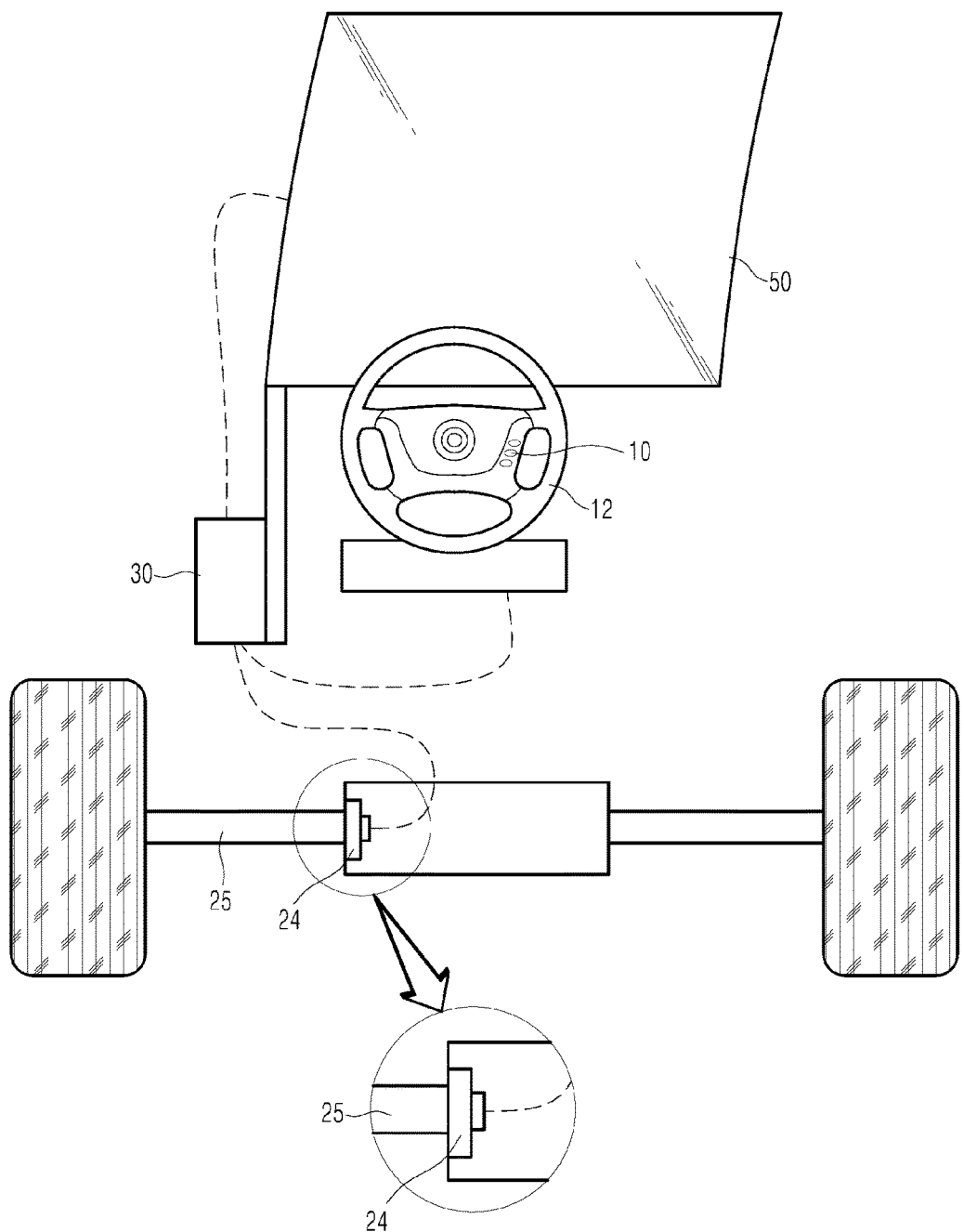
FIG. 3 is a view showing a second embodiment of an apparatus for controlling tint of a display panel provided on a vehicle window by using a speed detection sensor according to the present invention.

FIG. 3 is a view showing another embodiment of a display panel film having tint being adjusted depending on changes in speed of a vehicle, the vehicle being moved by a wheel and a driving shaft on which a speed detection sensor is provided.

The speed detection sensor 24 of the driving shaft 25 of a vehicle quantifies rotation speed of the driving shaft 25 into data, and outputs the data to the control unit 30. The control unit 30 adjusts tint of the display panel film 50 in the same manner of the above-described light detection sensor 22.

It is unnecessary to place the speed detection sensor 24 on the driving shaft 25. The speed detection sensor 24 provided on the driving shaft 25 may quantify speed of a vehicle into data. The speed is relative to time taken for a signal to be transmitted to a rotating wheel by the speed detection sensor, and then reflected and returned to the speed detection sensor. A method of quantifying a moving speed of a vehicle into data is not limited thereto.

Figure 4:
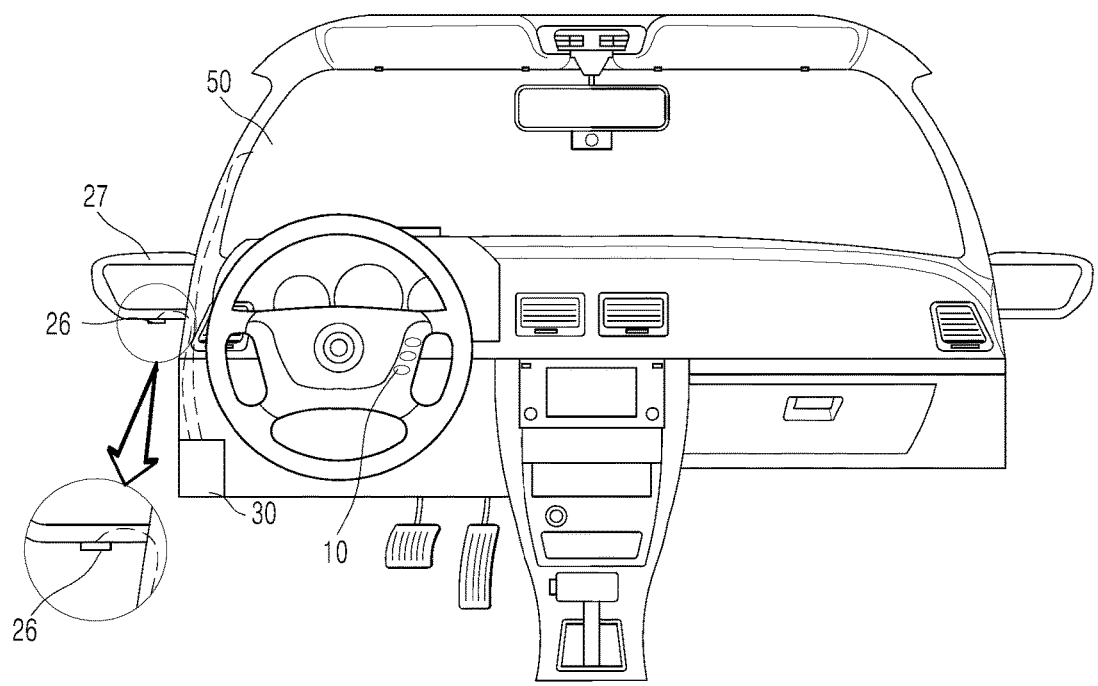
FIG. 4 is a view showing a third embodiment of an apparatus for controlling tint of a display panel provided on a vehicle window by using a temperature detection sensor according to the present invention.

FIG. 4 is a view showing another embodiment of a display panel film having tint being adjusted depending on changes of an external temperature of a vehicle.

A temperature detection sensor 26 is provided at the lower end of a wing mirror 27 that is the outside of a vehicle. The temperature detection sensor 26 quantifies an external temperature value into data as a signal, and outputs the signal to the control unit 30 so as to adjust tint of the display panel film 50.

In the meantime, power for the control unit 30 may be supplied from the battery 42 of the vehicle, and a blocking ratio of a vehicle window caused by the display panel film 50 is a value ranging 15~75% without violating regulations.

The display panel film 50 may be provided in various sizes, and attached on the whole of or a portion of a windshield of a vehicle. A driver may easily attach and detach the display panel film without help of an expert.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for controlling tint of a display panel provided on a window of a vehicle to adjust light transmittance, the apparatus comprising:
    a display panel film attached to a window glass of the vehicle window, and having an adjustable tint;
    an operation unit for setting the tint of the display panel film;
    a detection sensor unit for quantifying a change in an external environment into data; and
    a control unit for adjusting the tint of the display panel film according to a preset program, based on the data received from the detection sensor unit.

2. The apparatus of claim 1, wherein the detection sensor unit includes a light detection sensor attached to the window glass, the light detection sensor for outputting a signal indicative of an amount of detected light to the control unit so as to adjust the tint of the display panel film.

3. The apparatus of claim 2, wherein the control unit includes a variable resistor having a resistance value varied in response to a signal output from the detection sensor unit,
    wherein the varied resistance value varies a power value, and the tint of the display panel film is adjusted depending on the varied power value.

4. The apparatus of claim 1, wherein the detection sensor unit includes a speed detection sensor provided on a wheel and a driving shaft of the vehicle, the speed detection sensor for outputting a signal indicative of a speed change to the control unit so as to adjust the tint of the display panel film depending on a moving speed of the vehicle.

5. The apparatus of claim 4, wherein the control unit includes a variable resistor having a resistance value varied in response to a signal output from the detection sensor unit,
    wherein the varied resistance value varies a power value, and the tint of the display panel film is adjusted depending on the varied power value.

6. The apparatus of claim 1, wherein the detection sensor unit includes a temperature detection sensor for outputting a signal indicative of a temperature change to the control unit so as to adjust the tint of the display panel film.

7. The apparatus of claim 6, wherein the control unit includes a variable resistor having a resistance value varied in response to a signal output from the detection sensor unit,
    wherein the varied resistance value varies a power value, and the tint of the display panel film is adjusted depending on the varied power value.

* * * * *